Figure 1:
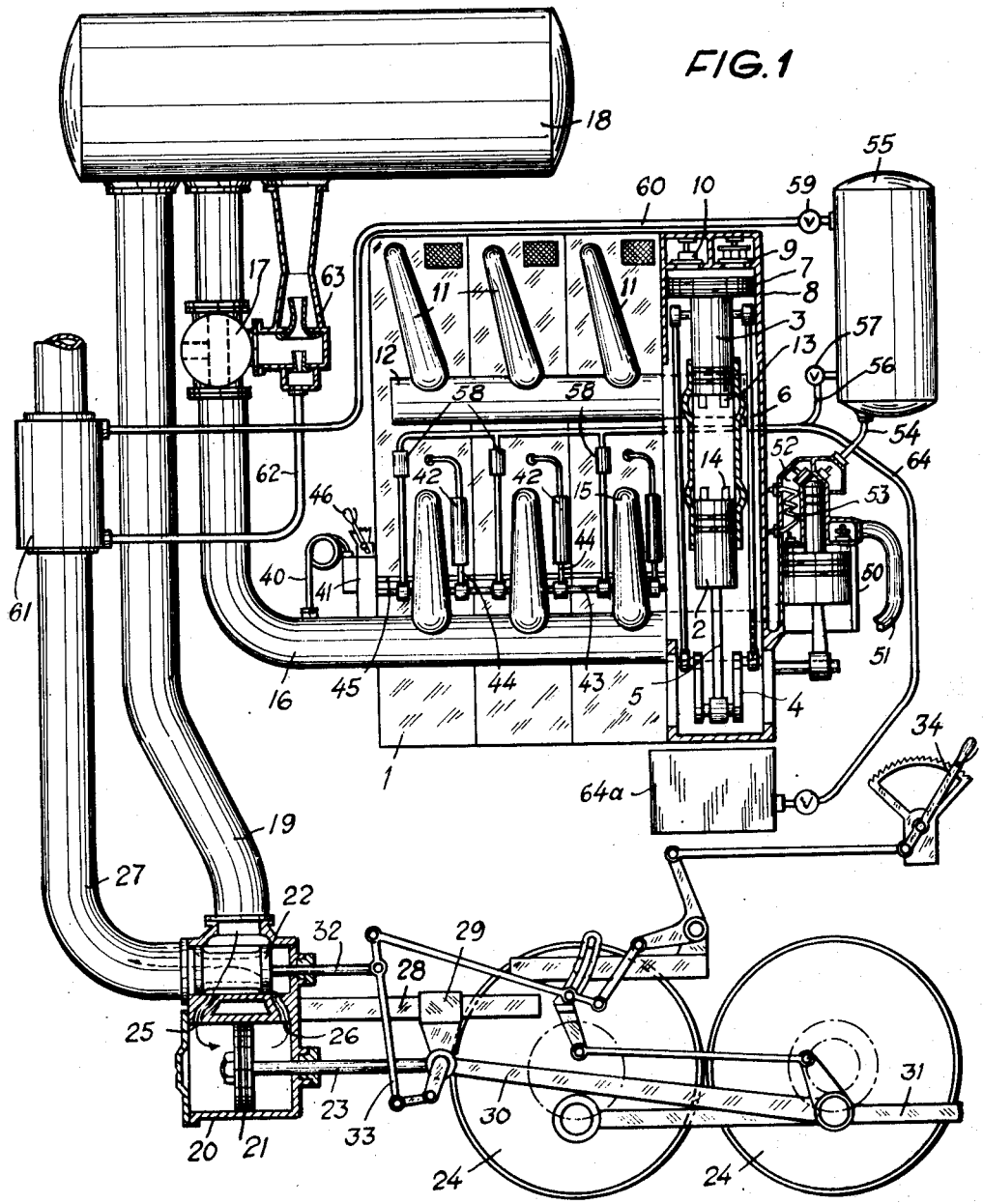

Aug. 11, 1953    J. E. JOHANSSON    2,648,189
INTERNAL-COMBUSTION ENGINE AND
PNEUMATIC TRANSMISSION DRIVE
Filed March 31, 1949    2 Sheets-Sheet 1

INVENTOR.:
Johan E. Johansson
BY
Cushman, Darby & Cushman
Attorneys

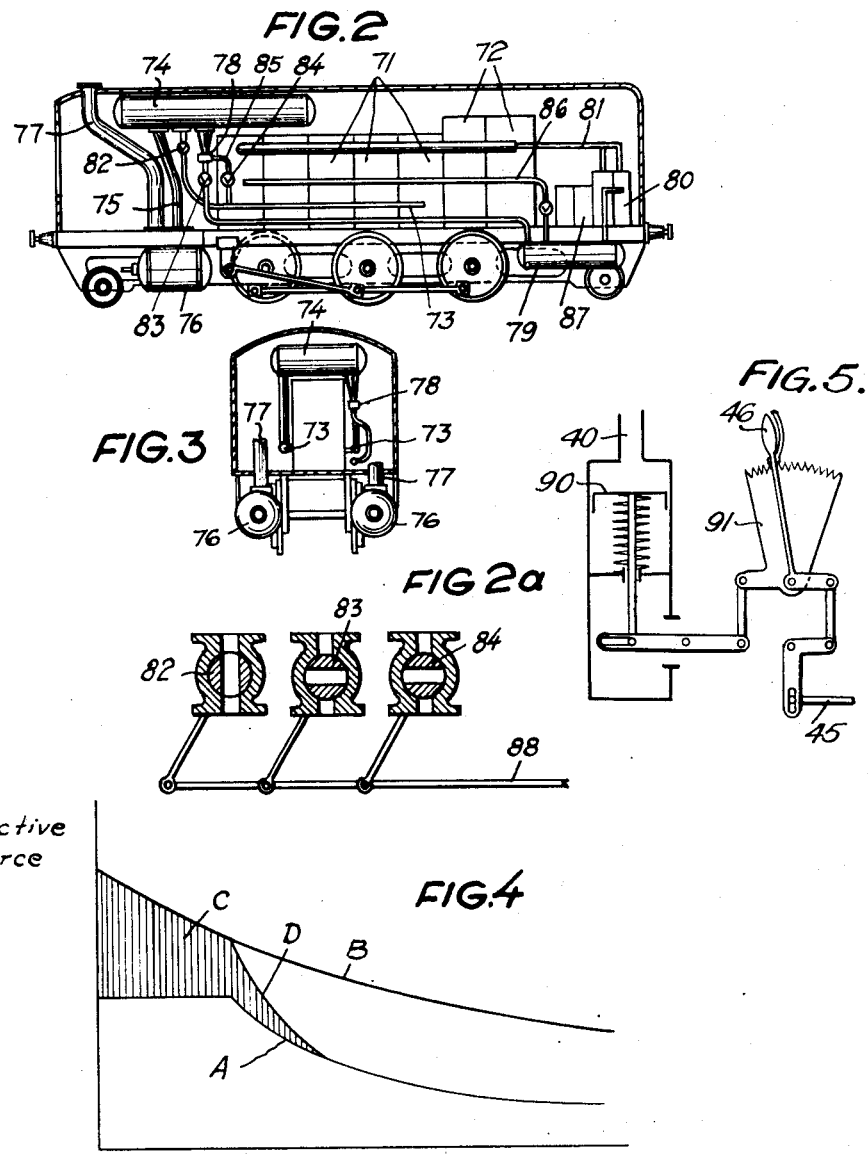

Patented Aug. 11, 1953

2,648,189

UNITED STATES PATENT OFFICE 2,648,189

INTERNAL-COMBUSTION ENGINE AND PNEUMATIC TRANSMISSION DRIVE

Johan Erik Johansson, Goteborg, Sweden, assignor to Aktiebolaget Gotaverken, Goteborg, Sweden, a corporation of Sweden Application March 31, 1949, Serial No. 84,568
In Sweden April 6, 1948

6 Claims. (Cl. 60—15)

This invention relates to vehicles driven by a prime mover fed with gas under pressure. In power plants comprising a pressure gas producer which includes a compressor and an internal combustion engine driving said compressor, and a prime mover, such as a turbine or reciprocating engine, fed with gases from the pressure gas producer, the pressure of the gases delivered by the pressure gas producer must be relatively low in view of the resistance of the material of the prime mover, since the temperature of the gases rises with increasing pressure. If the prime mover consists of a reciprocating engine, the temperature in continuous operation should not surmount about 750° F., the pressure of the gas being then about 56 lbs. per sq. in. Temporarily, a somewhat higher temperature and a correspondingly higher pressure may be permitted, such as a temperature of about 825° F. corresponding to a pressure of about 64 lbs. per sq. in.

In pressure gas producer plants for locomotives and similar vehicles it has to be observed that the transverse dimension of the locomotive must not surmount certain values which are different in different countries and result in a limitation of the diameter of the cylinder or cylinders of the prime mover. In case of British locomotives, said diameter should not exceed about 23 ins., while in Swedish and most other European locomotives the diameter may amount to 34 ins. and for certain American locomotives to 38 ins. In most of the European locomotives and very large American locomotives the starting tractive force becomes too small even at a gas pressure of 64 lbs. per sq. in.

The object of this invention is to provide means for rendering possible a temporary increase of the gas pressure, whereby to increase the tractive force, for instance during the start and on gradients. This object is attained by mechanism described with reference to the accompanying drawings in which—

Fig. 1 illustrates a driving power plant for locomotives; Fig. 2 is a longitudinal section of a modified embodiment; Fig. 2a is a section of a detail of construction; Fig. 3 is a cross-sectional view of the embodiment shown in Fig. 2; and Fig. 4 is a diagram illustrating the variation of the tractive force during the start of the locomotive. Fig. 5 shows diagrammatically an automatic fuel control device.

The power plant illustrated in Fig. 1 comprises a four-cylinder internal combustion engine 1 of the opposed piston type, one of the cylinders being shown in section. The pistons 2 and 3 are by means of a connecting rod 5 and a rod system 6, respectively, connected to a common crank shaft 4. The upper end of the piston 3 works as a scavenging air compressor and has for this purpose an enlarged portion 7 running in a corresponding cylinder 8. The cylinder 8 has an inlet valve 9 for atmospheric air and a valve 10 for discharging the compressed air into a tube 11 connected to a scavenging air conduit 12, common to all of the cylinders.

In the cylinder space between the engine pistons 2 and 3, scavenging ports 13 and exhaust ports 14 are provided in a manner known per se, the exhaust ports communicating with exhaust pipes 15 connected to a conduit 16 common to all of the cylinders and serving as a discharge conduit for gas under pressure. By means of a three-way valve 17, the conduit 16 communicates with a receiver 18, from which the pressure gas is supplied to the prime mover of the locomotive by means of a conduit 19.

In the embodiment illustrated, the prime mover is constituted by a reciprocating engine comprising a working cylinder 20 for a reciprocating piston 21. The engine is of the double acting type, the admission being controlled by a valve 22 which is actuated, in a manner known per se, by the transmission means provided between the piston rod 23 and the driving wheels 24 of the locomotive. With the piston 21 and the valve 22 in the positions shown in Fig. 1, pressure gas is admitted to the cylinder space to the left of the piston 21, the pressure gas passing from the conduit 19 through the midportion of the valve 22 and through ports 25 provided in the wall of the cylinder 20, whereas the expanded gas is exhausted from the cylinder space to the right of the piston 21 through ports 26 and through the central hollow portion of the valve 22 into the exhaust conduit 27.

The piston rod 23 is connected with a crosshead 29 slidable on a guide member 28. The crosshead is articulated to a connecting rod 30 which in turn is connected with one of the driving wheels 24 interconnected by means of a rod 31. The valve 22 has a control rod 32 projecting out of the valve box and articulated to a lever 33 one end of which is articulated to the crosshead 29, while the other end is connected, by means of a link system, to a control lever 34. By means of the lever 34, the admission to the cylinder 20 can be controlled, and the engine can be reversed.

The pressure gas conduit 16 communicates with a pipe 40 connected to a control device 41 for the fuel system of the engine 1. Each engine cylinder is provided with a separate fuel pump 42, said fuel pumps being driven by a cam shaft 43. The piston rods 44 of the fuel pumps 42 are, in a manner known per se, rotatable for controlling the amount of fuel injected, the rotary movement being effected by means of a diagrammatically indicated rack 45 extending along the engine. The fuel control device 41 is adjustable by means of a control lever 46 such as to provide for a certain pressure of the gas produced, said pressure being maintained constant by means of a pressure sensitive member (Fig. 5) comprising a spring actuated piston 90, which is acted upon by the pressure prevailing in the conduit 16 and which at a decrease of said pressure moves the segment 91 for the lever 46 and the rack 45 in a direction such as to increase the amount of fuel injected, and vice versa.

At one end of the engine 1 there is mounted a compressor 50 illustrated as a reciprocating compressor driven by the crank shaft 4 of the engine. The inlet conduit 51 of the compressor communicates with the ambient air. The compressor illustrated is constructed as a two-stage compressor, its piston having two portions of different diameters. The fluid compressed in the first stage is admitted to a space 52 provided with an intermediate cooler 53, and is then supplied to the second stage from which it flows through a conduit 54 into a vessel 55.

The vessel 55 contains air which may be mixed with exhaust gases, at a relatively high pressure, such as 700 to 850 lbs. per sq. in. By means of a conduit 56 having a valve 57, the vessel 55 communicates with starting air valves 58 controlled by the cam shaft 43 so that air under pressure can be used for starting the engine 1. By means of a conduit 60 having a valve 59, the vessel 55 further communicates with a heat exchanger 61 provided in the exhaust conduit 27. A conduit 62 connects the heat exchanger with an injector 63 exhausting into the receiver 18. By means of the three-way valve 17, the injector 63 can be put into communication with the pressure gas conduit 16, the direct connection between the conduit 16 and the receiver 18 being shut off at the same time. Consequently, it is possible to mix pressure gas from the conduit 16 with air arriving from the vessel 55 and having a considerably higher pressure so as to increase the pressure in the receiver 18 to a high degree, for instance to twice the normal gas pressure, resulting in a considerable increase of the output of the prime mover 20, 21 of the locomotive. It should be noted that this increase of pressure in the receiver 18 does not result in an increase of the temperature of the pressure gas, but rather lowers said temperature.

On account of the limited volume of the vessel 55, the increase of the output of the prime mover cannot be maintained during a long period of time, but can be obtained temporarily only, for instance at the start or on gradients. Fig. 4 illustrates diagrammatically the conditions prevailing during the start of the locomotive. The curve A indicates the tractive force at the ordinary pressure in the receiver, whereas curve B indicates the sliding limit, that is, the maximum tractive force which can be used at every instant without the risk of sliding. The hatched portion C represents the additional tractive force which can be obtained by means of the injector 63, and curve D illustrates how said additional tractive force is gradually decreased according as the amount of air in the vessel 55 is consumed.

In Fig. 1, there is further indicated a conduit 64 communicating with the conduit 56. The conduit 64 may be connected to a separate vessel 64a for starting air.

In the modified embodiment diagrammatically illustrated in Figs. 2 and 3, the pressure gas producer comprises an internal combustion engine having five engine cylinders 71 and two compressor cylinders 72. Pressure gas from the gas producer is supplied through a conduit 73 into a receiver 74. By means of conduits 75, the receiver is connected to the prime mover cylinders 76, the exhaust conduits of which are indicated at 77. The compressor 80 is supplied with precompressed air from the compressor 72, by means of the conduit 81 so that the compressor may be of relatively small size and shape.

An injector 78 may be supplied with air under pressure from the starting air vessel 79 of the gas producer. During the operation of the injector, a valve 82 in the ordinary gas conduit is closed, whereas a valve 83 in the pressure air conduit and a valve 84 in a by-pass conduit 85 for the gas are opened. The valves 82, 83 and 84 are advantageously provided with common means for remote control, such as a common control rod 88 indicated in Fig. 2a. Air under pressure is produced by a separate compressor 80 which by means of a conduit 81 is arranged in series after the compressor 72. The compressor 80 is constructed to be driven by a separate prime mover 87, for instance a two-cylinder internal combustion engine. The starting air system of the gas producer is diagrammatically indicated by the conduit 86.

What I claim is:

1. In a power plant for vehicles, an engine driving the vehicle, a pressure gas producer, a receiver, a first gas conduit for supplying gas under pressure from said producer to said receiver, a second gas conduit for supplying gas under pressure from said receiver to said engine, a storage vessel for a fluid under pressure, a pressure fluid conduit for supplying fluid under pressure from said storage vessel to said receiver, an injector in said pressure fluid conduit, a third gas conduit communicating with said first gas conduit and said injector, and valve means for alternately connecting said first gas conduit with said receiver and said injector.

2. In a power plant for vehicles, an engine driving the vehicle, a pressure gas producer, a receiver, a first gas conduit for supplying gas under pressure from said producer to said receiver, a second gas conduit for supplying gas under pressure from said receiver to said engine, a storage vessel for a fluid under pressure, a pressure fluid conduit for supplying fluid under pressure from said storage vessel to said receiver, an injector in said pressure fluid conduit, a third gas conduit communicating with said first gas conduit and said injector, a valve in said first gas conduit, a valve in said pressure fluid conduit, a valve in said third gas conduit, and means for opening one of said valves and simultaneously closing the other of said valves.

3. In a power plant for vehicles, an engine driving the vehicle, a pressure gas producer, a receiver, a first gas conduit for supplying gas under pressure from said producer to said receiver, a second gas conduit for supplying gas under pressure from said receiver to said engine, a storage vessel for a fluid under pressure, a pressure fluid conduit for supplying fluid under pressure from said storage vessel to said receiver, an injector in said pressure fluid conduit, a third gas conduit communicating with said first gas conduit and said injector, a valve in said first gas conduit, a valve in said pressure fluid conduit, a valve in said third gas conduit, and remote control means for opening one of said valves and simultaneously closing the other of said valves.

4. In a power plant for vehicles, an engine driving the vehicle, a pressure gas producer including an internal combustion engine, a first compressor driven by said combustion engine for supplying charging air to said engine, a starting air tank, a second compressor driven by said combustion engine for supplying compressed air to said tank, a gas conduit for supplying gas under pressure from said producer to said first-mentioned engine, an injector exhausting into said gas conduit, and a conduit for supplying air under pressure from said starting air tank to said injector to temporarily increase the pressure of the gas in said gas conduit.

5. In a power plant for vehicles, an engine driving the vehicle, a pressure gas producer including an internal combustion engine, a first compressor driven by said combustion engine for supplying charging air to said engine, a starting air tank, a second compressor supplying compressed air to said tank, a gas conduit for supplying gas under pressure from said producer to said first-mentioned engine, an injector exhausting into said gas conduit, and a conduit for supplying air under pressure from said starting air tank to said injector to temporarily increase the pressure of the gas in said gas conduit.

6. In a power plant for vehicles, an engine driving the vehicle, a pressure gas producer including an internal combustion engine, a first compressor driven by said combustion engine for supplying charging air to said engine, a starting air tank, a second compressor arranged in series after said first-named compressor and supplying compressed air to said tank, a gas conduit for supplying gas under pressure from said producer to said first-mentioned engine, an injector exhausting into said gas conduit, and a conduit for supplying air under pressure from said starting air tank to said injector to temporarily increase the pressure of the gas in said gas conduit.

JOHAN ERIK JOHANSSON.

References Cited in the file of this patent

UNITED STATES PATENTS

| Number | Name | Date |
|---|---|---|
| 228,250 | Eaton | June 1, 1880 |
| 442,793 | Bourne | Dec. 16, 1890 |
| 865,725 | Pope et al. | Sept. 10, 1907 |
| 868,372 | Tate | Oct. 15, 1907 |
| 1,380,795 | Graziano et al. | June 7, 1921 |
| 1,490,501 | Barnard | Apr. 15, 1924 |

FOREIGN PATENTS

| Number | Country | Date |
|---|---|---|
| 133,462 | Great Britain | Oct. 13, 1919 |
| 321,933 | Great Britain | Nov. 19, 1929 |